(12) United States Patent
Shimuta

(10) Patent No.: US 10,189,222 B2
(45) Date of Patent: Jan. 29, 2019

(54) DEVICE FOR SUPPLYING TIRE-CONSTITUTING MEMBER, METHOD FOR SUPPLYING TIRE-CONSTITUTING MEMBER, AND METHOD FOR MANUFACTURING UNVULCANIZED TIRE

(71) Applicant: BRIDGESTONE CORPORATION, Tokyo (JP)

(72) Inventor: Kohei Shimuta, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 208 days.

(21) Appl. No.: 15/127,307

(22) PCT Filed: Apr. 15, 2015

(86) PCT No.: PCT/JP2015/061614
§ 371 (c)(1),
(2) Date: Sep. 19, 2016

(87) PCT Pub. No.: WO2015/159921
PCT Pub. Date: Oct. 22, 2015

(65) Prior Publication Data
US 2017/0144397 A1    May 25, 2017

(30) Foreign Application Priority Data

Apr. 18, 2014 (JP) ................. 2014-086245

(51) Int. Cl.
*B29D 30/30* (2006.01)
*B29D 30/44* (2006.01)

(52) U.S. Cl.
CPC ......... *B29D 30/3007* (2013.01); *B29D 30/30* (2013.01); *B29D 2030/3064* (2013.01);
(Continued)

(58) Field of Classification Search
CPC ..... B29C 66/43; B29C 66/431; B29C 66/432; B29C 66/4324; B29C 66/4329;
(Continued)

(56) References Cited

U.S. PATENT DOCUMENTS 4,769,104 A    9/1988  Okuyama et al.
4,858,505 A    8/1989  Still et al.
(Continued)

FOREIGN PATENT DOCUMENTS

EP    2535175 A1    12/2012
GB    1421679 A     1/1976
(Continued)

OTHER PUBLICATIONS

Mar. 22, 2017 Search Report issued in European Patent Application No. 15779250.8.

*Primary Examiner* — George R Koch
(74) *Attorney, Agent, or Firm* — Oliff PLC

(57) ABSTRACT

A device for supplying a tire-constituting member includes a placement portion to which a tire-constituting member is supplied from the rear side to be placed on the placement portion, a first holding device to hold the tire-constituting member front end portion and is movable, a second holding device to hold the tire-constituting member rear end portion cut to a predetermined length and is movable, a detection device to detect the front end portion position placed on the placement portion, and a control unit which calculates deviation amounts with respect to preset reference positions of the front end portion according to data from the detection device and drives the first holding device in a state where the rear end portion is held by the second holding device such that the front end portion is positioned at the reference position according to the calculation results.

11 Claims, 5 Drawing Sheets

(52) U.S. Cl.
CPC ............... *B29D 2030/3085* (2013.01); *B29D 2030/4406* (2013.01); *B29D 2030/4462* (2013.01); *B29D 2030/4468* (2013.01)

(58) Field of Classification Search
CPC ............... B29D 30/30; B29D 30/3007; B29D 2030/3064; B29D 2030/3085; B29D 2030/4406; B29D 2030/4468
See application file for complete search history.

(56) References Cited

U.S. PATENT DOCUMENTS

| | | |
|---|---|---|
| 5,175,930 A | 1/1993 | Okuyama et al. |
| 5,292,398 A | 3/1994 | Miyamoto et al. |
| 5,720,837 A | 2/1998 | Regterschot et al. |
| 5,904,788 A | 5/1999 | Kitajima et al. |
| 5,935,377 A | 8/1999 | Sergel et al. |
| 2012/0111473 A1* | 5/2012 | Hasegawa ........... B29C 65/7847 156/64 |

FOREIGN PATENT DOCUMENTS

| | | |
|---|---|---|
| JP | S64-30738 A | 2/1989 |
| JP | 2012-179854 A | 9/2012 |

* cited by examiner

DEVICE FOR SUPPLYING TIRE-CONSTITUTING MEMBER, METHOD FOR SUPPLYING TIRE-CONSTITUTING MEMBER, AND METHOD FOR MANUFACTURING UNVULCANIZED TIRE

This application is a 371 of PCT/JP2015/061614, filed on Mar. 15 2015.

TECHNICAL FIELD

The present invention relates to a device for supplying a tire-constituting member, a method for supplying a tire-constituting member, and a method for manufacturing an unvulcanized tire.

Priority is claimed on Japanese Patent Application No. 2014-086245, filed Apr. 18, 2014, the content of which is incorporated herein by reference.

BACKGROUND ART

In the related art, as described in the following Patent Document 1, a method for supplying a tire-constituting member which supplies a tire-constituting member cut to a predetermined length to the front side of a molding drum is known.

CITATION LIST

Patent Document

[Patent Document 1] Japanese Unexamined Patent Application, First Publication No. 2012-179854

SUMMARY OF INVENTION

Technical Problem

However, in the method for supplying a tire-constituting member in the related art, the tire-constituting member is easily contraction-deformed before the tire-constituting member is wound around a molding drum after the tire-constituting member is cut to a predetermined length, and there is a problem that the tire-constituting member is not easily wound around the molding drum accurately.

Here, in general, compared to a rear end portion of the tire-constituting member cut to the predetermined length, in a front end portion thereof, the time until the tire-constituting member is wound around the molding drum after the tire-constituting member is cut is longer. Accordingly, the contraction-deformation amount increases, and the above-described problem is significant.

The present invention is made in consideration of the above-described circumstances, and an object thereof is to provide a device for supplying a tire-constituting member, a method for supplying a tire-constituting member, and a method for manufacturing an unvulcanized tire in which a tire-constituting member cut to a predetermined length can be accurately wound around a molding drum.

Solution to Problem

In order to solve the above-described problem and achieve the object, according to a first aspect of the present invention, there is provided a device for supplying a tire-constituting member which supplies a tire-constituting member to the front side of a molding drum, includes: a placement portion to which the tire-constituting member is supplied from the rear side so as to be placed on the placement portion; first holding means which is disposed so as to hold a front end portion of the tire-constituting member and is disposed so as to be movable; and a second holding means which is disposed so as to hold a rear end portion of the tire-constituting member cut to a predetermined length and is disposed so as to be movable, in which the first and second holding means hold the tire-constituting member, which is cut to the predetermined length and is positioned on the placement portion, and supply the tire-constituting member to the front side, the device further including: detection means configured to detect the position of the front end portion of the tire-constituting member placed on the placement portion; and a control unit which calculates a deviation amount with respect to preset reference positions of the front end portion of the tire-constituting member according to data from the detection means and drives the first holding means in a state where the rear end portion of the tire-constituting member is held by the second holding means such that the front end portion of the tire-constituting member is positioned at the reference position according to the calculation results.

In addition, according to a second aspect of the present invention, in a method for supplying a tire-constituting member which supplies a tire-constituting member to the front side of a molding drum, including: a detection process of detecting a position of a front end portion of the tire-constituting member, which is placed on a placement portion and is cut to a predetermined length, using a detection means; a calculation process of calculating a deviation amount of the front end portion of the tire-constituting member with respect to a preset reference position according to data of the detection means; a holding process of holding the front end portion of the tire-constituting member cut to the predetermined length by a first holding means and a rear end portion thereof by a second holding means; and a restoring process of driving the first holding means according to the calculation results obtained by the calculation process in a state where the rear end portion of the tire-constituting member is held by the second holding means, and positioning the front end portion of the tire-constituting member at the preset reference position.

Moreover, according to a third aspect of the present invention a method for manufacturing an unvulcanized tire supplies a tire-constituting member to the front side of a molding drum using the device for supplying a tire-constituting member of the present invention, winds the tire-constituting member around a molding drum, and forms an unvulcanized tire.

According to the present invention, the control unit calculates the deviation amount of the front end portion of the tire-constituting member with respect to the preset reference position according to the data from the detection means. Since the first holding means is driven such that the front end portion of the tire-constituting member is positioned at the reference position according to the calculation results, it is possible to position the front end portion of the tire-constituting member at the reference position before the tire-constituting member is wound around the molding drum.

In this case, since the first holding means is driven in the state where the second holding means holds the rear end portion of the tire-constituting member, even when the tire-constituting member cut to the predetermined length is contraction-deformed, the deformation is eliminated, and it is possible to restore the tire-constituting member to a size and a shape which serves as references.

Accordingly, the tire-constituting member cut to the predetermined length can be supplied to the molding drum in a state where the tire-constituting member has the reference size and is positioned at the reference position, and it is possible to accurately wind the tire-constituting member cut to the predetermined length around the molding drum.

In addition, since the first and second holding means restore the tire-constituting member as described above, holds the tire-constituting member which is cut to the predetermined length and is placed on the placement portion, and supplies the tire-constituting member to the front side, the tire-constituting member can be supplied to the front side immediately after the above-described restoration or the like is performed on the tire-constituting member, and it is possible to efficiently form the unvulcanized tire.

Here, in the device for supplying a tire-constituting member of the present invention, the first holding means may extend so as to hold the front end portion of the tire-constituting member over the entire length, may extend in an upward-downward direction, and may be disposed so as to be rotatable around an axis which is positioned at the center portion in the extension direction of the first holding means. In addition, the control unit may drive the first holding means such that the extension direction of the first holding means coincides with the extension direction of the front end portion of the tire-constituting member in a plan view, according to the data of the detection means in advance before the front end portion of the tire-constituting member is held by the first holding means.

In addition, in the method for supplying a tire-constituting member of the present invention, the first holding means may extend so as to hold the front end portion of the tire-constituting member over the entire length, may extend in an upward-downward direction, and may be disposed so as to be rotatable around an axis which is positioned at the center portion in the extension direction of the first holding means. In addition, a positioning process of driving the first holding means such that the extension direction of the first holding means coincides with the extension direction of the front end portion of the tire-constituting member in a plan view in advance before the holding process may be further provided.

In this case, the first holding means holds the front end portion of the tire-constituting member in the state where the extension direction of the first holding means coincides with the extension direction of the front end portion of the tire-constituting member in a plan view. Accordingly, thereafter, when the first holding means is rotated around the axis, the front end edge on the front end portion of the tire-constituting member is easily positioned at the reference position according to the data from the detection means. In addition, when the tire-constituting member is wound around the molding drum, it is possible to prevent so-called positional deviation, in which the positions of the front end portion and the rear end portion in a width direction are deviated from each other, from occurring.

Moreover, in the device for supplying a tire-constituting member of the present invention, the control unit may drive the first holding means such that the axis is positioned at the center portion of the front end portion of the tire-constituting member, according to the data of the detection means in advance before the front end portion of the tire-constituting member is held by the first holding means.

Moreover, in the method for supplying a tire-constituting member of the present invention, in the positioning process, the first holding means may be driven such that the axis is positioned at the center portion of the front end portion of the tire-constituting member.

In this case, the first holding means holds the front end portion of the tire-constituting member in the state where the axis is positioned at the center portion on the front end portion of the tire-constituting member. Accordingly, thereafter, when the first holding means is rotated around the axis, it is possible to reliably position the front end edge on the front end portion of the tire-constituting member at the reference position according to the data from the detection means.

In addition, in the device for supplying a tire-constituting member of the present invention, when the control unit drives the first holding means and positions the front end portion of the tire-constituting member at the reference position, the control unit may lift the first and second holding means and separate the tire-constituting member upward from the placement portion.

Moreover, in the method for supplying a tire-constituting member of the present invention, in the restoring process, in a state where the tire-constituting member is separated upward from the placement portion, the first holding means may be driven and the front end portion of the tire-constituting member may be positioned at the reference position.

In this case, when the front end portion of the tire-constituting member is positioned at the reference position, since the tire-constituting member is separated upward from the placement portion, it is possible to easily and accurately position the front end portion of the tire-constituting member at the reference position.

In addition, the front end portion of the tire-constituting member is positioned at the reference position in the state where the tire-constituting member is separated upward from the placement portion. Accordingly, it is possible to increase manufacturing efficiency of the unvulcanized tire, and if centering accuracy of the first holding means with respect to the molding drum is secured, the position of the front end portion of the tire-constituting member with respect to the molding drum is accurately determined regardless of the centering accuracy of the placement portion with respect to the molding drum, and it is possible to decrease installation man-hours and maintenance man-hours for the present supply device.

Moreover, in the device for supplying a tire-constituting member of the present invention, the detection means may detect the rear end portion of the tire-constituting member placed on the placement portion, and the control unit may calculate the deviation amount of the rear end portion of the tire-constituting member with respect to the preset reference position according to the data from the detection means and drive the second holding means such that the rear end portion of the tire-constituting member is positioned at the reference position according to the calculation results.

In addition, in the method for supplying a tire-constituting member of the present invention, in the detection process, the position of the rear end portion of the tire-constituting member which is placed on the placement portion and is cut to the predetermined length may be detected by the detection means, and in the calculation processing, a deviation amount of the rear end portion of the tire-constituting member with respect to the preset reference position may be calculated according to the data from the detection means. In addition, in the restoring process, the second holding means may be driven according to the calculation results obtained by the calculation process, and the rear end portion of the tire-constituting member may be positioned at the preset reference position.

In this case, since not only the front end portion of the tire-constituting member but also the rear end portion thereof are positioned at the reference positions by the second holding means, it is possible to accurately wind the tire-constituting member cut to the predetermined length around the molding drum.

Advantageous Effects of Invention

According to the present invention, it is possible to accurately wind the tire-constituting member cut to the predetermined length around the molding drum.

DESCRIPTION OF EMBODIMENTS

Figure 1:
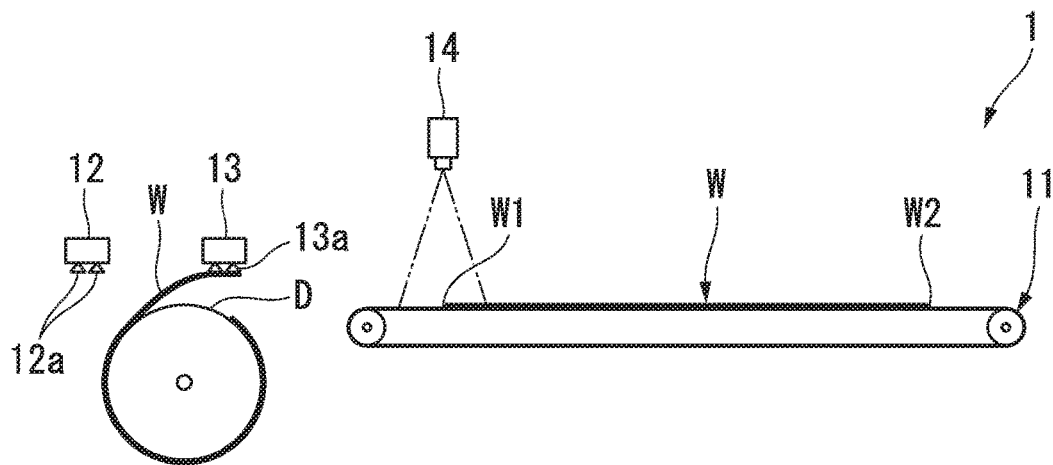
FIG. 1 is a view showing a first process of a method for supplying a tire-constituting member according to an embodiment of the present invention.

Hereinafter, an embodiment of a device for supplying a tire-constituting member according to the present invention will be described with reference to FIGS. 1 to 6.

A device 1 for supplying a tire-constituting member W includes a placement portion to which the tire-constituting member W is supplied from the rear side so as to be placed on the placement portion 11, first holding means 12 which is disposed so as to hold a front end portion W1 of the tire-constituting member W and is disposed so as to be movable, and second holding means 13 which is disposed so as to hold a rear end portion W2 of the tire-constituting member W cut to a predetermined length and is disposed so as to be movable. In addition, the device 1 for supplying the tire-constituting member W is configured to hold the tire-constituting member W, which is cut to a predetermined length and is placed on the placement portion 11, by the first and second holding means 12 and 13 and to supply the tire-constituting member W to the front side.

In addition, the supply device 1 includes detection means 14 configured to detect each of the positions of the front end portion W1 and the rear end portion W2 of the tire-constituting member W placed on the placement portion 11, and a control unit which drives the first and second holding means 12 and 13 according to the data from the detection means 14 in a state where the front end portion W1 of the tire-constituting member W is held by the first holding means 12 and the rear end portion W2 of the tire-constituting member W is held by the second holding means 13.

In addition, in the rear side of the supply device 1, a feeding device (not shown) which rotates a roll body around, which a long tire-constituting member W is wound, around an axis of the roll body and feeds the tire-constituting member W to the front side of the placement portion 11 side, and a cutting device (not shown) which is disposed between the feeding device and the placement portion 11 and cuts the tire-constituting member W to a predetermined length are disposed.

The placement portion 11 extends in a front-rear direction, has a placement surface facing upward in a vertical direction, and supports the tire constituting member W, which has been fed from the feeding device, from the lower portion in the vertical direction in a state where the front and rear surfaces of the tire-constituting member W face the vertical direction.

Moreover, the tire-constituting member W may be a sheet body in which multiple cords extending in one direction in the horizontal direction are embedded in a state where the cords are connected to each other in the other direction orthogonal to the one direction, and may be a sheet body to which the cords are not embedded. In addition, for example, the cords may extend in a front-rear direction in the horizontal direction, and may extend in a right-left direction orthogonal to the front-rear direction.

Figure 3:
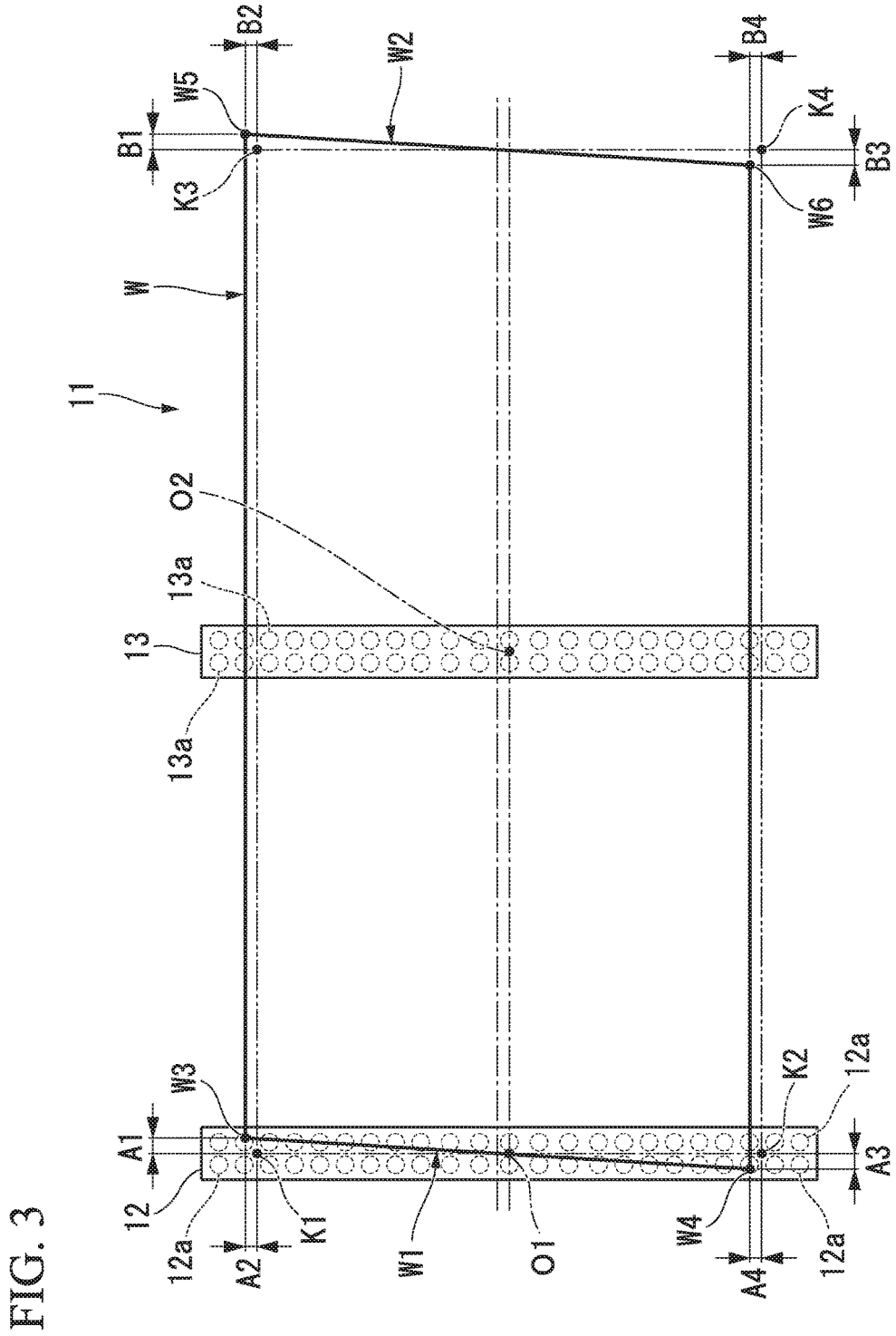
FIG. 3 is a top view showing a main portion of FIG. 2.

Each of the first holding means 12 and the second holding means 13 is disposed so as to be movable in the front-rear direction, the right-left direction, and the upward-downward direction. The first holding means 12 extends so as to hold the front end portion W1 of the tire-constituting member W over the entire length, and the second holding means 13 extends so as to hold the rear end portion W2 of the tire-constituting member W over the entire length. The first holding means 12 and the second holding means 13 extend in the width direction of the tire-constituting member W. As shown in FIG. 3, the first holding means 12 and the second holding means 13 extends in the upward-downward direction, and are disposed so as to be rotatable around the axes O1 and O2 which are positioned at the center portions in the extension directions thereof. The axes O1 and O2 are positioned at the center portions in the front-rear direction in the first and second holding means 12 and 13.

The first holding means 12 is positioned before the second holding means 13. In the first and second holding means 12 and 13, vacuum pads 12a and 13a are disposed on suction surfaces facing the lower placement surfaces, and the tire-constituting member W is held by suction forces of the vacuum pads 12a and 13a. In addition, instead of the vacuum pads 12a and 13a, for example, a magnet or the like may be adopted. In the suction surfaces of the first and second holding means 12 and 13, multiple vacuum pads 12a and 13a are disposed over the entire region of the suction surfaces, and suction both end portions W1 and W2 in the front-rear direction of the tire-constituting member W cut to a predetermined length over the entire region in the right-left direction thereof The first and second holding means 12 and 13 are installed on a pair of right and left guide rails (not shown), which extends in the front-rear direction above the placement portion 11, so as to be movable forward and backward in the front-rear direction. When the first and second holding means 12 and 13 moves forward, the first and second holding means 12 and 13 reaches above the molding drum D which is positioned before the placement portion 11. The first holding means 12 places the front end portion W1 of the tire-constituting member W on the outer peripheral surface of the molding drum D. In a process in which the tire-constituting member W is wound around the molding drum D, when the rear end portion W2 of the tire-constituting member W is wound around the molding drum D, the second holding means 13 is lowered toward the molding drum D.

The detection means 14 is disposed so as to be movable in the front-rear direction, and detects positions of both the front end portion W1 and the rear end portion W2 of the tire-constituting member W by one detection means 14. Examples of the detection means 14 include a camera, a laser, or the like. In addition, a plurality of detection means 14 may be disposed.

In the present embodiment, the detection means 14 specifies the positions of both ends in the right-left direction in each of the front end edge of the front end portion W1 and the rear end edge of the rear end portion W2 of the tire-constituting member W. That is, the detection means 14 specifies the positions of four corner portions W3, W4, W5, and W6 of the tire-constituting member W which is cut to a predetermined length.

Next, an operation of the device 1 for supplying the tire-constituting member W which is configured as described above will be described.

First, as shown in FIG. 1, the first and second holding means 12 and 13 are positioned above the molding drum D before the placement portion 11, and the detection means 14 is positioned above the front end portion W1 of the tire-constituting member W positioned on the placement portion 11. In addition, as shown in FIG. 3, the positions of two corner portions W3 and W4 in the front end portion W1 of the tire-constituting member W are detected by the detection means 14.

Figure 2:
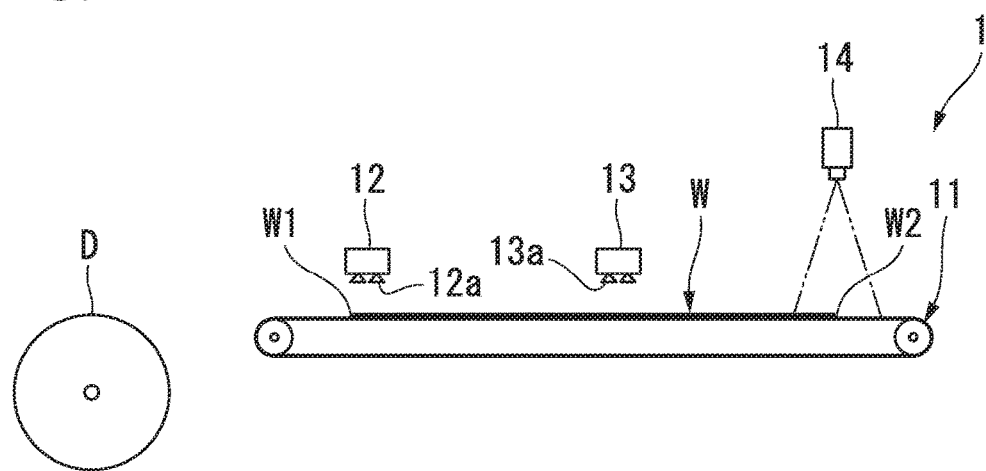
FIG. 2 is a view showing a second process of the method for supplying a tire-constituting member according to the embodiment of the present invention.

Next, as shown in FIG. 2, the first and second holding means 12 and 13 moves backward and is positioned above the placement portion 11. In addition, the detection means 14 moves backward and is positioned above the rear end portion W2 of the tire-constituting member W which is cut to the predetermined length. In addition, as shown in FIG. 3, the positions of two corner portions W5 and W6 in the rear end portion W2 of the tire-constituting member W is detected by the detection means 14 (detection process).

Next, according to positional data of both the front end portion W1 and the rear end portion W2 of the tire-constituting member W detected by the detection means 14, the control unit calculates deviation amounts A1, A2, A3, and A4 of two corner portions W3 and W4 of the front end portion W1 of the tire-constituting member W with respect to preset reference positions K1 and K2, and calculates deviation amounts B1 B2, B3, and B4 of two corner portions W5 and W6 of the rear end portion W2 with respect to preset reference positions K3 and K4 (calculation process). In this case, the control unit calculates each of the deviation amounts A1 to A4 and B1 to B4 in the four corner portions W3 to W6 of the tire-constituting member W cut to a predetermined length in each of the two directions of the front-rear direction and the right-left direction.

Figure 4:
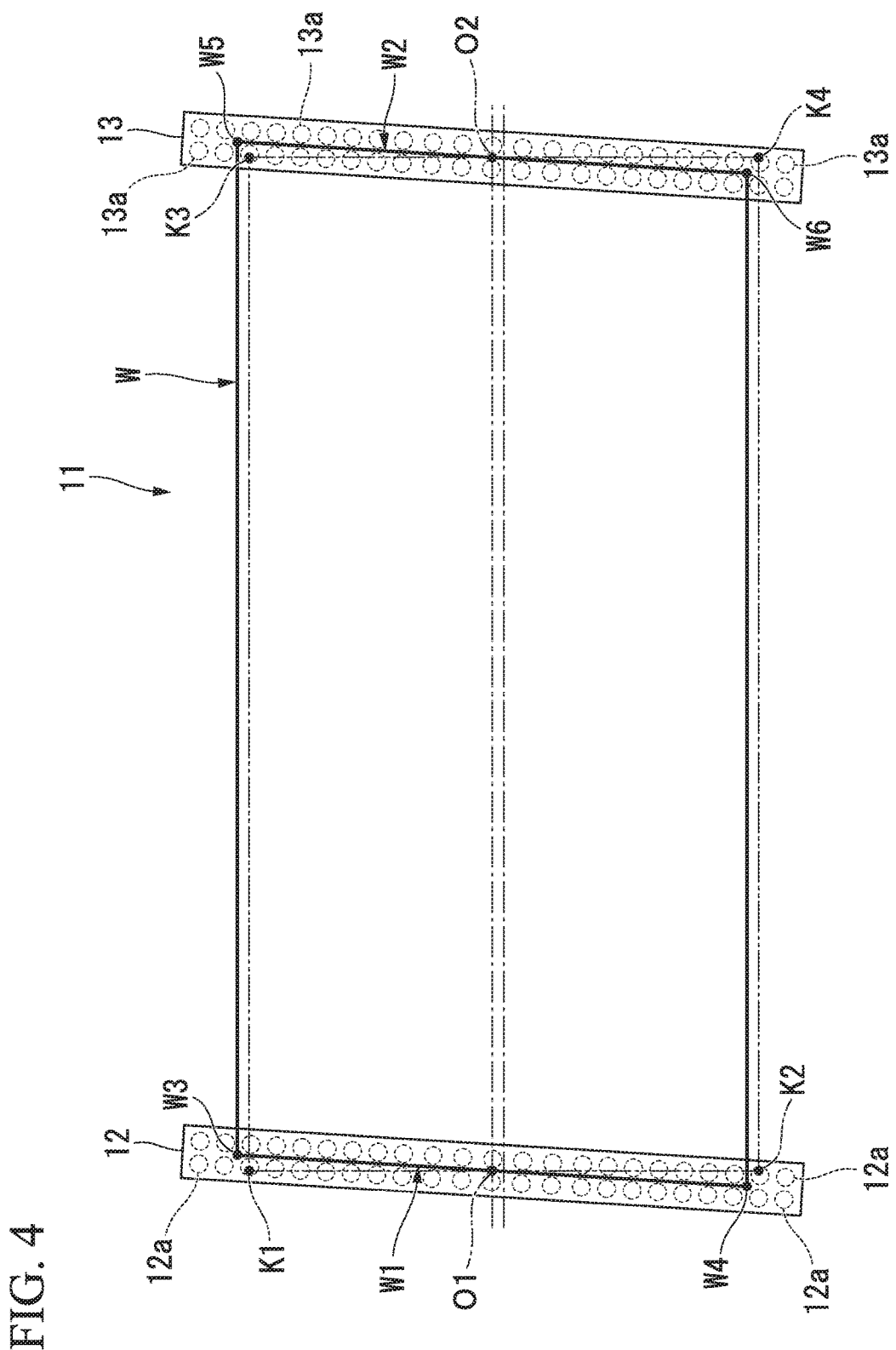
FIG. 4 is a view showing a fourth process of the method for supplying a tire-constituting member according to the embodiment of the present invention.

In addition, as shown in FIG. 4, according to the data from the detection means 14, the control unit drives the first holding means 12 such that the extension direction of the first holding means 12 coincides with the direction in which the front end portion W1 of the tire-constituting member W extends and the axis O1 is positioned at the center portion of the front end portion W1 of the tire-constituting member W in a plan view (positioning process). In this time, the axis O1 is positioned on the front end edge of the front end portion W1 of the tire-constituting member W. In addition, similarly to the first holding means 12, the control unit drives the second holding means 13 with respect to the rear end portion W2 of the tire-constituting member W.

Next, the first and second holding means 12 and 13 are lowered, and the entire region of each of the front end portion W1 and the rear end portion W2 of the tire-constituting member W in the right-left direction is suctioned by the vacuum pads 12a and 13a and is held (holding process). Thereafter, the first and second holding means 12 and 13 are lifted along with the tire-constituting member W, and the tire-constituting member W is separated upward from the placement portion 11.

Figure 5:
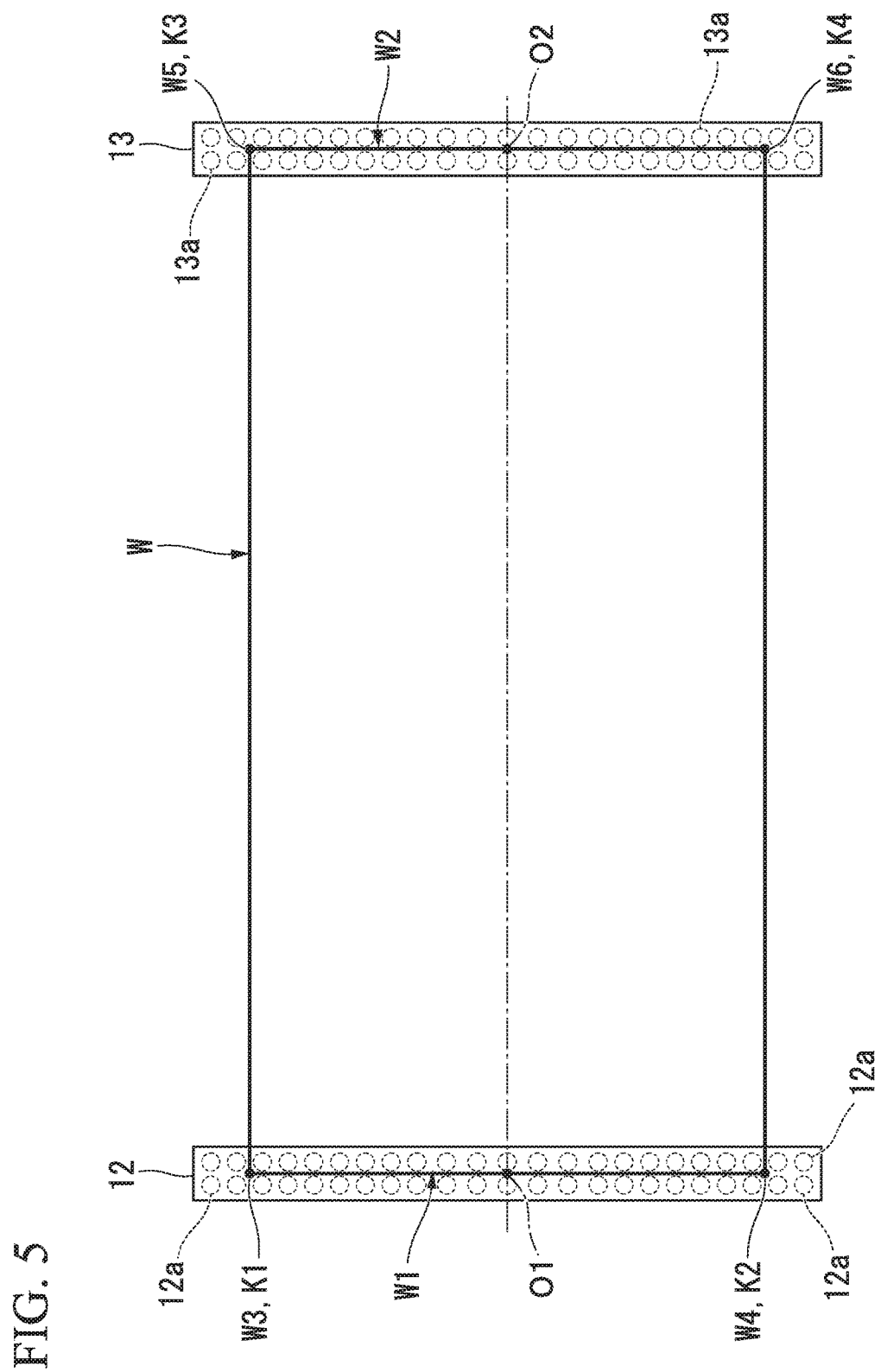
FIG. 5 is a view showing a fifth process of the method for supplying a tire-constituting member according to the embodiment of the present invention.

In addition, as shown in FIG. 5, the control unit drives the first and second holding means 12 and 13, positions the four corner portions W3 to W6 of the tire-constituting member W at the reference positions K1 to K4, and eliminates the above-described deviation amounts A1 to A4 and B1 to B4 (restoring process).

Accordingly, in a case where the tire-constituting member W is contraction-deformed, the deformation is eliminated, and in a case where the position of the tire-constituting member W is deviated, the deviation is eliminated.

Figure 6:
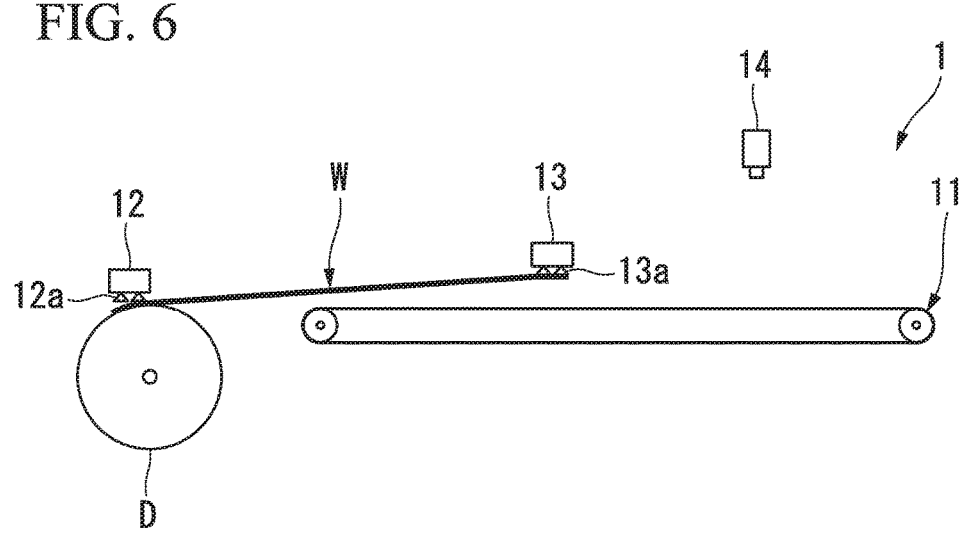
FIG. 6 is a view showing a sixth process of the method for supplying a tire-constituting member according to the embodiment of the present invention.

Next, as shown in FIG. 6, the tire-constituting member W is moved forward by the first and second holding means 12 and 13, and the front end portion W1 of the tire-constituting member W is placed on the molding drum D by the first holding means 12. Thereafter, the tire-constituting member W is wound around the molding drum D while the molding drum D rotates around the axis, and thus, an unvulcanized tire is formed. In addition, when the rear end portion W2 of the tire-constituting member W is wound around the molding drum D, the second holding means 13 is lowered toward the molding drum D.

As described above, according to the device 1 for supplying the tire-constituting member W, the method for supplying the tire-constituting member W, and the method for manufacturing an unvulcanized tire of the present embodiment, the control unit calculates the deviation amounts A1 to A4 of the front end portion W1 of the tire-constituting member W with respect to the preset reference positions K1 and K2, according to the data from the detection means 14. According to the calculation results, since the first holding means 12 is driven such that the front end portion W1 of the tire-constituting member W is positioned at the reference positions K1 and K2, it is possible to position the front end portion W1 of the tire-constituting member W at the reference positions K1 and K2 before the tire-constituting member W is wound around the molding drum D.

In this time, since the first holding means 12 is driven in the state where the second holding means 13 holds the rear end portion W2 of the tire-constituting member W, even when the tire-constituting member W cut to a predetermined length is contraction-deformed, the deformation is eliminated, and it is possible to restore the tire-constituting member W to a size and a shape which serves as references.

Accordingly, the tire-constituting member W cut to the predetermined length can be supplied to the molding drum D in a state where the tire-constituting member has the reference size and is positioned at the reference position, and it is possible to accurately wind the tire-constituting member W cut to the predetermined length around the molding drum D.

In addition, since the first and second holding means 12 and 13 restore the tire-constituting member W as described above, holds the tire-constituting member W which is cut to the predetermined length and is placed on the placement portion 11, and supplies the tire-constituting member W to the front side, the tire-constituting member W can be supplied to the front side immediately after the above-described restoration or the like is performed on the tire-constituting member, and it is possible to efficiently form the unvulcanized tire.

In addition, the first holding means 12 holds the front end portion W1 of the tire-constituting member W in the state where the extension direction of the first holding means 12 coincides with the extension direction of the front end portion W1 of the tire-constituting member W in a plan view. Accordingly, thereafter, when the first holding means 12 is rotated around the axis O1, the front end edge on the front end portion W1 of the tire-constituting member W is easily positioned at the reference positions K1 and K2 according to the data from the detection means 14. In addition, when the tire-constituting member W is wound around the molding drum D, it is possible to prevent so-called positional deviation, in which the positions of the front end portion W1 and the rear end portion W2 in the width direction are deviated from each other, from occurring.

In addition, the first holding means 12 holds the front end portion W1 of the tire-constituting member W in the state where the axis O1 is positioned at the center portion on the front end portion W1 of the tire-constituting member W. Accordingly, thereafter, when the first holding means 12 is rotated around the axis O1, it is possible to reliably position the front end edge on the front end portion W1 of the tire-constituting member W at the reference positions K1 and K2 according to the data from the detection means 14.

In addition, when the front end portion W1 of the tire-constituting member W is positioned at the reference positions K1 and K2, since the tire-constituting member W is separated upward from the placement portion 11, it is possible to easily and accurately position the front end portion W1 of the tire-constituting member W at the reference positions K1 and K2.

In addition, the front end portion W1 of the tire-constituting member W is positioned at the reference positions K1 and K2 in the state where the tire-constituting member W is separated upward from the placement portion 11. Accordingly, it is possible to increase manufacturing efficiency of the unvulcanized tire, and if centering accuracy of the first holding means 12 with respect to the molding drum D is secured, the position of the front end portion W1 of the tire-constituting member W with respect to the molding drum D is accurately determined regardless of the centering accuracy of the placement portion 11 with respect to the molding drum D, and it is possible to decrease installation man-hour and maintenance man-hour of the present supply device 1.

Moreover, in the present embodiment, since not only the front end portion W1 of the tire-constituting member W is positioned at the reference positions K1 and K2 but also the rear end portion W2 thereof is positioned at the reference positions K3 and K4 by the second holding means 13, it is possible to accurately wind the tire-constituting member W cut to the predetermined length around the molding drum D.

In addition, the present invention is not limited to the above-described embodiment, and various modifications may be applied to the present invention within a scope which does not depart from the aim of the present invention.

For example, in the above-described embodiment, as the portions at which the front end portion W1 and the rear end portions W2 of the tire-constituting member W are positioned at the reference positions K1 to K4, the four corner portions W3 to W6 are shown. However, other portions of each of the front end portion W1 and the rear end portion W2 of the tire-constituting member W may be positioned at the reference positions.

Moreover, in the above-described embodiment, the configuration is shown in which not only the front end portion W1 of the tire-constituting member W is positioned at the reference positions K1 and K2 but also the second holding means 13 is driven so as to position the rear end portion W2 thereof at the reference positions K3 and K4. However, only the first holding means 12 may be driven so as to position the front end portion W1 of the tire-constituting member W at the reference positions K1 and K2.

Moreover, timing when the first holding means 12 holds the front end portion W1 of the tire-constituting member W and timing when the detection means 14 detects the position of the front end portion W1 of the tire-constituting member W may be before or after the tire-constituting member W is cut to a predetermined length so as to form the rear end portion W2.

In addition, when the rear end portion W2 side of the tire-constituting member W is wound around the molding drum D, the second holding means 13 may not be positioned before the placement portion 11.

Moreover, the components of the above-described embodiment may be appropriately replaced with well-known components within a scope which does not depart from the aim of the present invention, and the above-described modification examples may be appropriately combined.

INDUSTRIAL APPLICABILITY

According to a device for supplying a tire-constituting member, a method for supplying a tire-constituting member, and a method for manufacturing an unvulcanized tire of the present invention, it is possible to accurately wind a tire-constituting member cut to a predetermined length around a molding drum.

REFERENCE SIGNS LIST

1: device for supplying tire-constituting member
11: placement portion
12: first holding means
13: second holding means
14: detection means
A1 to A4 and B1 to B4: deviation amount
D: molding drum
K1 to K4: reference position
O1 and O2: axis
W: tire-constituting member
W1: front end portion
W2: rear end portion

The invention claimed is:
1. A device for supplying a tire-constituting member which supplies a tire-constituting member to the front side of a molding drum, comprising:
    a placement portion to which the tire-constituting member is supplied from the rear side so as to be placed on the placement portion;
    a first holder which is disposed so as to hold a front end portion of the tire-constituting member and is disposed so as to be movable; and
    a second holder which is disposed so as to hold a rear end portion of the tire-constituting member cut to a predetermined length and is disposed so as to be movable;

wherein the first holder and the second holder hold the tire-constituting member that is cut to the predetermined length and is positioned on the placement portion, and supply the tire-constituting member to the front side, the device further comprising:

a detector configured to detect positions of two corner portions of the front end portion of the tire-constituting member placed on the placement portion; and a control unit which calculates a deviation amount of the two corner portions of the front end portion with respect to two preset reference positions of the two corner portions of the front end portion of the tire-constituting member according to data from the detector and drives the first holder in a state where the rear end portion of the tire-constituting member is held by the second holder such that the two corner portions of the front end portion of the tire-constituting member are positioned at the two reference positions of the two corner portions of the front end portion so as to eliminate the deviation amount of the two corner portions of the front end portion according to the calculation results.

2. The device for supplying a tire-constituting member according to claim 1, wherein the first holder extends so as to hold the front end portion of the tire-constituting member over the entire length, extends in an upward-downward direction, and is disposed so as to be rotatable around an axis which is positioned at the center portion in the extension direction of the first holder, and wherein the control unit drives the first holder such that the extension direction of the first holder coincides with the extension direction of the front end portion of the tire-constituting member in a plan view, according to the data of the detector in advance before the front end portion of the tire-constituting member is held by the first holder.

3. The device for supplying a tire-constituting member according to claim 2, wherein the control unit drives the first holder such that the axis is positioned at the center portion of the front end portion of the tire-constituting member, according to the data of the detector in advance before the front end portion of the tire-constituting member is held by the first holder.

4. The device for supplying a tire-constituting member according to claim 1, wherein when the control unit drives the first holder and positions the front end portion of the tire-constituting member at the reference position, the control unit lifts the first holder and the second holder and separates the tire-constituting member upward from the placement portion.

5. The device for supplying a tire-constituting member according to claim 1, wherein the detector detects the positions of two corner portions of the rear end portion of the tire-constituting member placed on the placement portion, and wherein the control unit calculates a deviation amount of the two corner portions of the rear end portion of the tire-constituting member with respect to two preset reference positions of the two corner portions of the rear portion according to the data from the detector, and drives the second holder such that the two corner portions of the rear end portion of the tire-constituting member are positioned at the two reference positions of the two corner portions of the rear end portion so as to eliminate the deviation amount of the two corner portions of the rear end portion according to the calculation results.

6. A method for supplying a tire-constituting member which supplies a tire-constituting member to the front side of a molding drum, comprising:

a detection process of detecting positions of two corner portions of a front end portion of the tire-constituting member, which is placed on a placement portion and is cut to a predetermined length, using a detector;

a calculation process of calculating a deviation amount of the two corner portions of the front end portion of the tire-constituting member with respect to two preset reference positions of the two corner portions of the front end portion according to data of the detector;

a holding process of holding the front end portion of the tire-constituting member cut to the predetermined length by a first holder and a rear end portion thereof by a second holder; and a restoring process of driving the first holder according to the calculation results obtained by the calculation process in a state where the rear end portion of the tire-constituting member is held by the second holder, and positioning the two corner portions of the front end portion of the tire-constituting member at the two preset reference positions of the two corner portions of the front end portion so as to eliminate the deviation amount of the two corner portions of the front end portion.

7. The method for supplying a tire-constituting member according to claim 6, wherein the first holder extends so as to hold the front end portion of the tire-constituting member over the entire length, extends in an upward-downward direction, and is disposed so as to be rotatable around an axis which is positioned at the center portion in the extension direction of the first holder, and a positioning process of driving the first holder such that the extension direction of the first holder coincides with the extension direction of the front end portion of the tire-constituting member in a plan view in advance before the holding process is further provided.

8. The method for supplying a tire-constituting member according to claim 7, wherein in the positioning process, the first holder is driven such that the axis is positioned at the center portion of the front end portion of the tire-constituting member.

9. The method for supplying a tire-constituting member according to claim 6, wherein in the restoring process, in a state where the tire-constituting member is separated upward from the placement portion, the first holder is driven and the front end portion of the tire-constituting member is positioned at the reference position.

10. The method for supplying a tire-constituting member according to claim 6, wherein in the detection process, positions of the two corner portions of the rear end portion of the tire-constituting member which is placed on the placement portion and is cut to the predetermined length is detected by the detector, wherein in the calculation processing, a deviation amount of the two corner portions of the rear end portion of the tire-constituting member with respect to two preset reference positions of the two corner portions of the rear end portion is calculated according to the data from the detector, and wherein in the restoring process, the second holder is driven according to the calculation results obtained by the calculation process, and the two corner portions of the rear end portion of the tire-constituting member are positioned at the two preset reference positions of the two corner portions of the rear end portion so as to eliminate the deviation amount of the two corner portions of the rear end portion.

11. A method for manufacturing an unvulcanized tire which supplies a tire-constituting member to the front side of a molding drum using the device for supplying a tire-constituting member according to claim 1, winds the tire-constituting member around a molding drum, and forms an unvulcanized tire.

\* \* \* \* \*